(12) United States Patent
Choi et al.

(10) Patent No.: US 7,733,273 B2
(45) Date of Patent: Jun. 8, 2010

(54) RADIO FREQUENCY IDENTIFICATION TAG ANTENNA FOR ATTACHING TO METAL

(75) Inventors: Won Kyu Choi, Daejeon (KR); Jeong Seok Kim, Daejeon (KR); Gil Young Choi, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 170 days.

(21) Appl. No.: 12/135,993

(22) Filed: Jun. 9, 2008

(65) Prior Publication Data

US 2009/0085809 A1 Apr. 2, 2009

(30) Foreign Application Priority Data

Sep. 28, 2007 (KR) .................. 10-2007-0097822

(51) Int. Cl.
*H01Q 1/38* (2006.01)
(52) U.S. Cl. .............................. 343/700 MS
(58) Field of Classification Search .......... 343/700 MS, 343/702, 850, 860
See application file for complete search history.

(56) References Cited

U.S. PATENT DOCUMENTS

| 6,028,564 | A | 2/2000 | Duan et al. |
| 6,215,402 | B1 | 4/2001 | Rao Kodukula et al. |
| 6,285,342 | B1 | 9/2001 | Brady et al. |
| 6,535,175 | B2 | 3/2003 | Brady et al. |
| 6,873,292 | B2 * | 3/2005 | Yoo et al. ................... 343/702 |
| 7,397,430 | B2 * | 7/2008 | Harihara ............... 343/700 MS |
| 7,545,328 | B2 * | 6/2009 | Son et al. ............... 343/700 MS |
| 7,557,757 | B2 * | 7/2009 | Deavours et al. ...... 343/700 MS |
| 7,589,675 | B2 * | 9/2009 | Chang et al. .......... 343/700 MS |

(Continued)

FOREIGN PATENT DOCUMENTS

KR 1020060064454 6/2006

(Continued)

OTHER PUBLICATIONS

Byunggil Yu, RFID Tag Antenna Using Two-Shorted Microstrip Patches Mountable on Metallic Objects, Microwave and Optical Technology Letters, Feb. 2007, pp. 414-416, vol. 49, No. 2, RFIC Research and Education Center, Kwangwoon University, 447-1 Wolgye-Dong, Nowon-Gu, Seoul, 139-701, Korea, Department of Electrical and Computer Engineering, Southern Illinois University Carbondale, Carbondale IL 62901-6603.

(Continued)

*Primary Examiner*—Hoang V Nguyen
(74) *Attorney, Agent, or Firm*—Jae Y. Park; Kile Goekjian Reed & McManus

(57) ABSTRACT

An antenna includes a polyhedral dielectric material, a feed loop, a polygonal radiating patch, and shorting plates. The feed loop is electrically connected with a radio frequency identification (RFID) tag chip for supplying power to the RFID tag chip. The polygonal radiating patch is magnetically coupled with the feed loop for radiating the electromagnetic waves. Each of the shorting plates disconnects the radiating patch and a ground surface and controls the magnetic coupling of the radiating patch and the feed loop. Accordingly, an RFID tag that can be attached to a metal material is provided.

10 Claims, 7 Drawing Sheets

U.S. PATENT DOCUMENTS

2006/0158380 A1 7/2006 Son et al.

FOREIGN PATENT DOCUMENTS

KR 100705359 4/2007

OTHER PUBLICATIONS

Kipo Office Action dated Nov. 29, 2008 on the instant application's foreign priority application (Korean Patent Application No. 10-2007-0097822). All references cited in the KIPO Office Action are cited above and provided herewith.

* cited by examiner

RADIO FREQUENCY IDENTIFICATION TAG ANTENNA FOR ATTACHING TO METAL

CROSS-REFERENCE TO RELATED APPLICATION

This application claims priority to and the benefit of Korean Patent Application No. 10-2007-0097822 filed in the Korean Intellectual Property Office on Sep. 28, 2007, the entire contents of which are incorporated herein by reference.

BACKGROUND OF THE INVENTION (a) Field of the Invention

The present invention relates to a radio frequency identification tag. More particularly, it relates to a radio frequency identification tag for attaching to metal.

The present invention was supported by the IT R&D program of MIC/IITA [2006-S-023-02, Development of Advanced RFID System Technology].

(b) Description of the Related Art

A radio frequency identification (RFID) tag is used in various fields such as distribution and material handling industries together with an RFID reader.

When an object to which the RFID tag is attached accesses a read zone of the RFID reader, the RFID reader transmits an interrogation signal to the RFID tag by modulating an RF signal by using a specific carrier frequency and the RFID tag responds to the interrogation of the RFID reader.

That is, the RFID reader transmits an interrogation signal to the RFID tag by modulating a continuous electromagnetic wave having a specific frequency, and the RFID tag transmits back the electromagnetic wave transmitted from the RFID reader after performing back-scattering modulation in order to transmit its own information stored in the RFID tag's internal memory. The back-scattering modulation is a method for transmitting tag information by modulating the amplitude and/or the phase of a scattered electromagnetic wave when the RFID tag transmits the electromagnetic wave that is initially transmitted from the RFID reader back to the RFID reader by scattering the electromagnetic wave.

Since a passive RFID tag does not include a separate operation power source, it rectifies the electromagnetic wave transmitted from the RFID reader and uses the rectified electromagnetic wave as its own power source to acquire operation power. The intensity of the electromagnetic wave transmitted from the RFID reader should be larger than a specific threshold value for normal operation. However, since the transmission power of the reader is limited by local regulations of each country, it is not possible to unconditionally raise the level of transmission power.

Therefore, the RFID tag should efficiently receive the electromagnetic wave transmitted from the RFID reader to extend the read zone without raising the transmission power level of the reader. A method for raising the receiving efficiency of the RFID tag is to perform complex conjugate matching of an antenna and a radio frequency (RF) front-end of the RFID tag chip so as to maximize the intensity of the signal received by the RFID tag.

A conventional radio frequency identification tag will be described in detail with reference to FIG. 1.

FIG. 1 is a configuration of a conventional RFID tag.

As shown in FIG. 1, the RFID tag includes an RFID tag chip 10 and an RFID tag antenna 20.

The RFID tag chip 10 stores information on an object to which the RFID tag is attached, and modulates the amplitude and/or the phase of an electromagnetic wave transmitted from an RFID reader for transmitting the information of the object. The RFID tag chip 10 modulates the amplitude and/or the phase of the wave by controlling the amount of power through input impedance, and includes an RF front-end that has input impedance.

The RFID tag antenna 20 scatters the electromagnetic wave that is modulated by the RFID tag chip 10. The RFID tag antenna 20 includes a dielectric material 21, a feed loop 23, radiating patches 25, and shorting plates 27.

The dielectric material 21 is rectangular-shaped with a relatively low dielectric constant, and a bottom surface of the dielectric material 21 is a ground surface that contacts the object.

The feed loop 23 is formed in an upper surface of the dielectric material 21, and electrically connected to the RFID tag chip 10 so as to supply power thereto.

Each of the radiating patches 25 is formed in the upper surface of the dielectric material 21, and excites a current having an out-of-phase characteristic by using a current flowing through the feed loop 23 and radiates the excited current.

Each of the shorting plates 27 is formed in a part of a side surface of the dielectric material 21 and connects the radiating patches 25 and the ground surface. That is, the shorting plates 27 disconnect the radiating patches 25 and the ground surface.

Generally, in an RFID system including an RFID tag and an RFID reader, transmission power of the RFID reader is limited by local regulations of each country. Therefore, in order to extend a read zone of the RFID reader, the RFID tag antenna should have high efficiency, the RFID tag should resonate at a corresponding frequency, and the RFID tag antenna and the RF front-end of the RFID tag chip should be complex-conjugate matched.

However, the conventional RFID tag shown in FIG. 1 is not provided with a method for controlling impedance matching of RFID tag chips that have various impedance characteristics.

Further, there are difficulties in miniaturizing the RFID tag antenna and reducing cost.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to realize a small antenna for a radio frequency identification (RFID) tag and provides a RFID tag that can be attached to a metal material.

To achieve the above-described objects, according to one exemplary embodiment of the present invention, an antenna is attached to an object and transmits electromagnetic waves that are modulated by a RFID tag chip, and includes a polyhedral dielectric material, a feed loop, a polygonal radiating patch, and shorting plates. The polyhedral dielectric material includes a first side that is adjacent to the object, a second side that is parallel with the first side, and a third side that connects the first side and the second side. The feed loop has a vertical length and a horizontal length, and is formed in a part of an area in the second side. The area is adjacent to the third side. The feed loop is electrically connected with the RFID tag chip for supplying power to the RFID tag chip. The polygonal radiating patch is formed in a part of the second side and is magnetically coupled with the feed loop for radiating the electromagnetic waves. Each of the shorting plates is formed in a part of the third side, and disconnects the radiating patch and a ground surface, and controls the magnetic coupling of the radiating patch and the feed loop.

Impedance of the antenna is conjugate-matched with impedance of the RFID tag chip.

A relative dielectric constant of the dielectric material is greater than 20.

The dielectric material is made of a ceramic material and has a hexahedral shape.

The feed loop has a concave polygon shape including two sides that are parallel with the third side, and the radiating patch is a concave polygon having more sides than the feed loop.

A reactance component of the impedance of the antenna corresponds to the horizontal length of the feed loop.

A resistance component of the impedance of the antenna corresponds to an area of the shorting plate.

According to another exemplary embodiment of the present invention, an antenna is attached to an object and transmits electromagnetic waves modulated by an RFID tag chip, and includes a hexahedral dielectric material, a feed loop, a polygonal radiating patch, and shorting plates. The hexahedral dielectric material is attached to a bottom surface of the object. The feed loop is formed in a part of an upper surface of the dielectric material, adjacent to a first side among a plurality of sides of the dielectric material, and is electrically connected with the RFID tag chip for supplying power to the RFID tag chip. The polygonal radiating patch is formed in a part of the upper surface of the dielectric material and is magnetically coupled with the feed loop for radiating the electromagnetic waves. Each of the shorting plates is formed in a part of the first side, and disconnects the radiating patch and the bottom surface of the dielectric material.

A relative dielectric constant of the dielectric material is greater than 20.

A sign of a reactance component of impedance of the antenna and a sign of a reaction component of impedance of the RFID tag chip are opposite to each other.

According to the embodiments of the present invention, a small RFID tag antenna can be realized, an RFID tag that can be attached to a metal material can be realized, and an RFID tag antenna that can be efficiently matched with a RFID tag chip by controlling impedance of the RFID tag antenna can be realized.

DETAILED DESCRIPTION OF THE EMBODIMENTS

Figure 1:
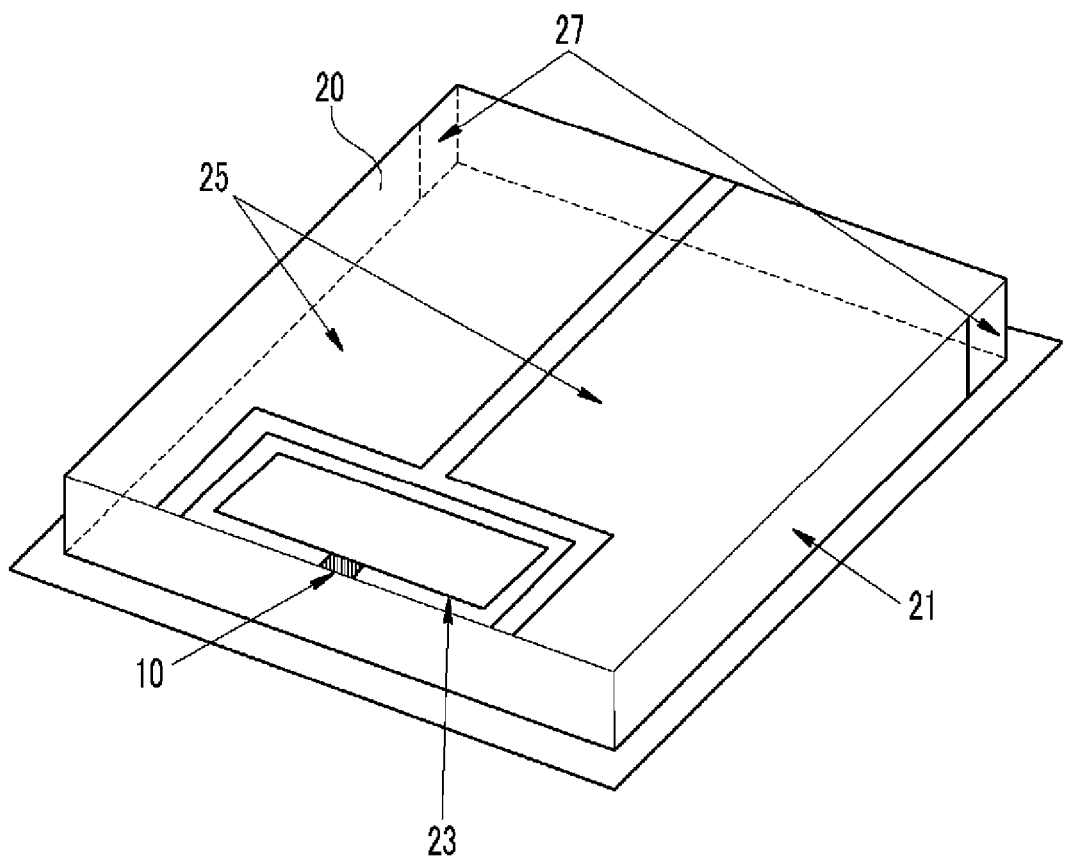
FIG. 1 is a configuration of a conventional radio frequency identification (RFID) tag.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements.

A radio frequency identification tag antenna according to an exemplary embodiment of the present invention will now be described with reference to drawings.

An equivalent circuit of a radio frequency identification (RFID) antenna and a radio frequency (RF) front-end according to an exemplary embodiment of the present invention will now be described with reference to FIG. 2.

Figure 2:
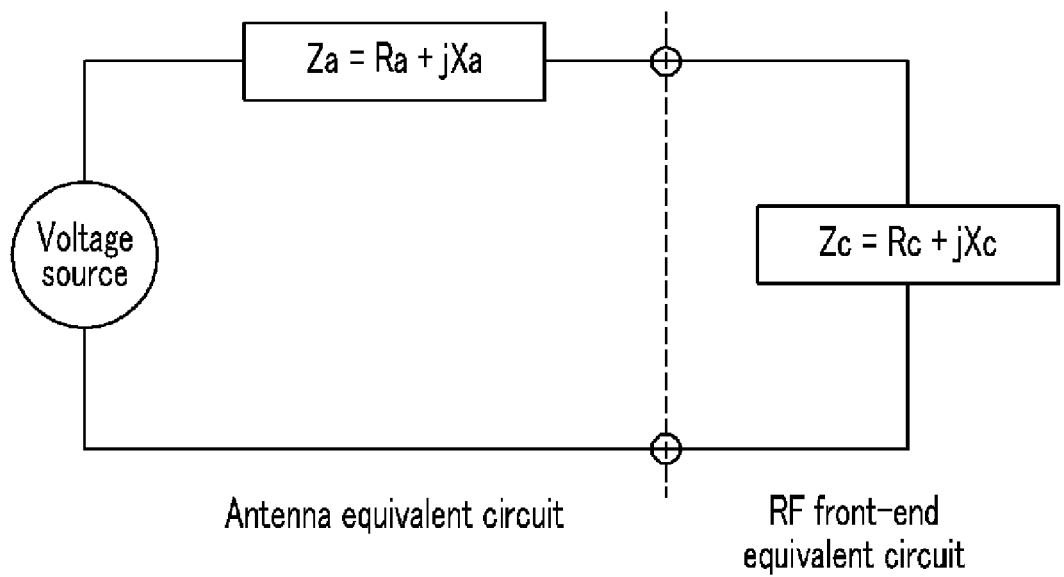
FIG. 2 is an equivalent circuit diagram of an RFID tag antenna and a radio frequency (RF) front-end.

FIG. 2 is an equivalent circuit diagram of an RFID tag antenna and an RF front-end.

As shown in FIG. 2, the equivalent circuit includes a voltage source, impedance of the RFID tag antenna, and impedance of the RF front end. Herein, the impedance $Z_a$ of the voltage source and the RFID tag antenna is an equivalent circuit of the RFID tag antenna, and the impedance $Z_c$ of the RF front-end is an equivalent circuit of the RF front-end.

The impedance $Z_a$ of RFID tag antenna has a real part $R_a$ and an imaginary part $X_a$, and the impedance $Z_c$ of the RF front-end has a real part $R_c$ and an imaginary part $X_c$.

The RFID tag antenna transmits the maximum power to the RF front-end of a RFID tag chip by conjugate matching the impedance $Z_a$ of the RFID tag antenna and the impedance $Z_c$ of the RF front-end as shown in Equation 1.

$$R_a = R_c$$
$$X_a = -X_c \qquad \text{[Equation 1]}$$

A typical impedance value of the RF front-end is 50Ω, but in the exemplary embodiment of the present invention, the impedance of the RF front-end has a complex value. That is, the impedance $Z_c$ of the RF front-end has a relatively small resistance component $R_c$ and a relatively large capacitive reactance component $X_c$. Therefore, the impedance $X_a$ of the antenna should have a small resistance component $R_a$ and a large inductive reactance component $X_a$, and should simultaneously resonate at a corresponding frequency.

Figure 3:
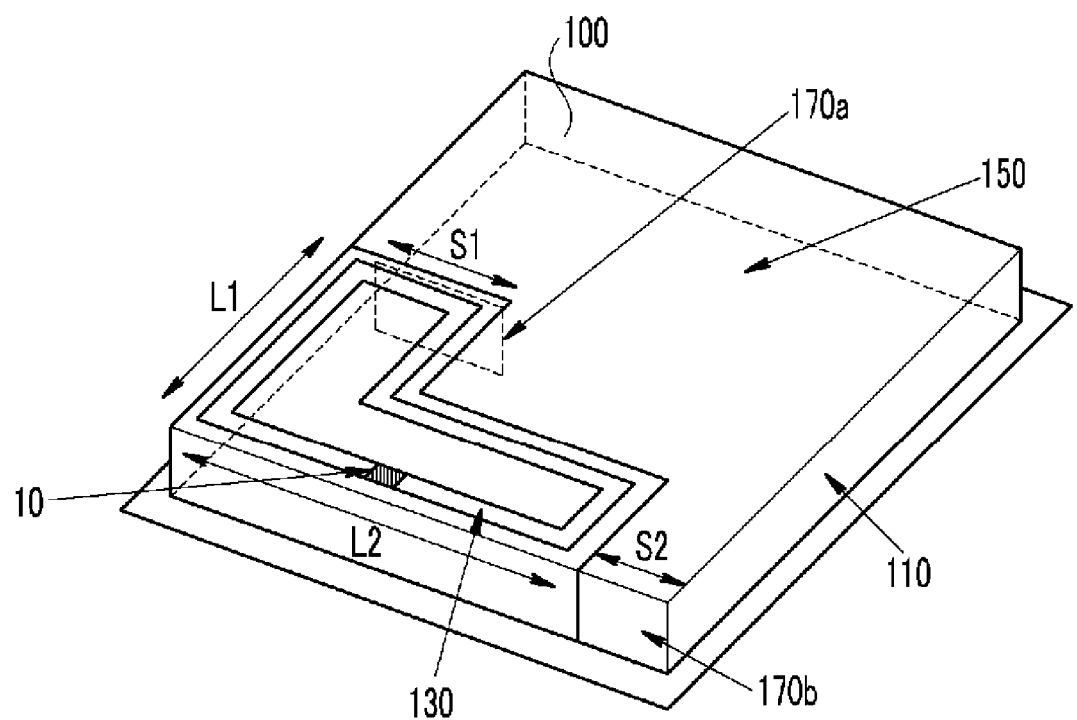
FIG. 3 is a configuration of an RFID tag according to one exemplary embodiment of the present invention.
Figure 4:
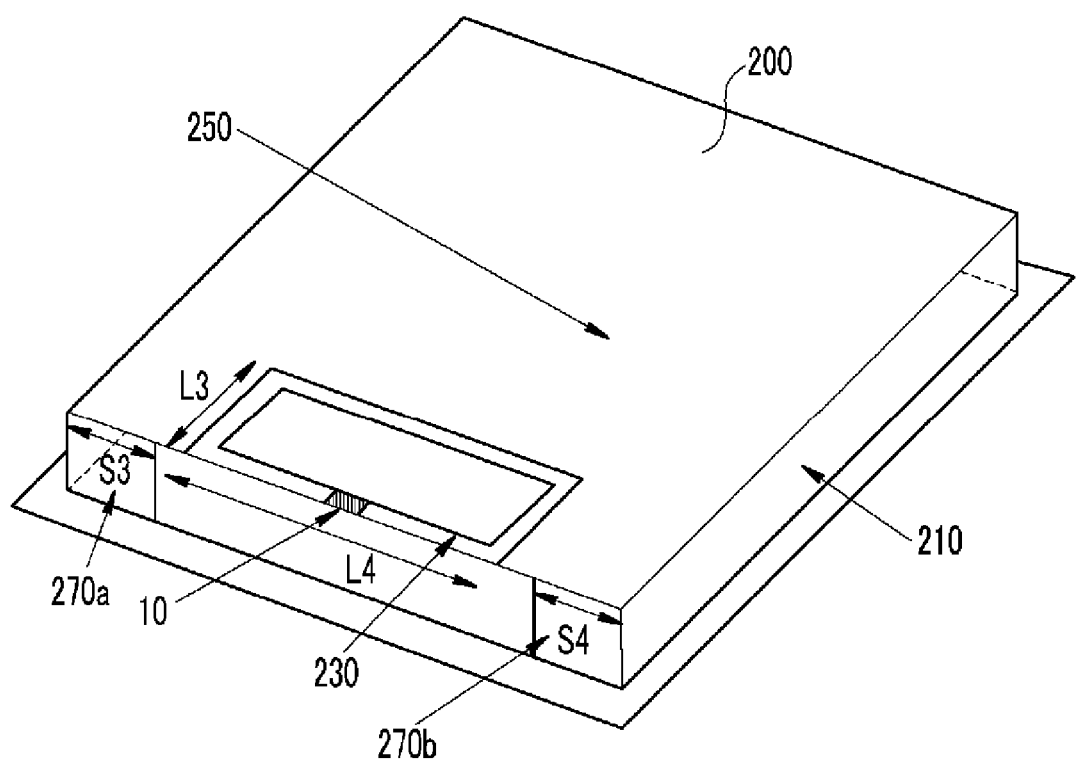
FIG. 4 is a configuration of an RFID tag according to another exemplary embodiment of the present invention.

With reference to FIG. 3 or FIG. 4, an RFID tag including a patch-structured RFID tag antenna according to the exemplary embodiment of the present invention will be described.

FIG. 3 is a configuration of an RFID tag according to an exemplary embodiment of the present invention.

As shown in FIG. 3, the RFID tag according to the exemplary embodiment of the present invention includes an RFID tag chip 10 and an RFID tag antenna 100.

The RFID tag chip 10 includes information on an object to which an RFID tag is attached, and modulates the amplitude and/or the phase of electromagnetic waves transmitted from the RFID reader so as to transmit the object information. The RFID tag chip 10 controls the amount of power by using an input impedance so as to modulate the amplitude and/or the phase of the electromagnetic waves, and includes an RF front-end having the input impedance.

The RFID tag antenna 100 includes a ceramic dielectric material 110, a feed loop 130, a radiating patch 150, and shorting plates 170a and 170b.

The hexahedral ceramic dielectric material 110 has a relative dielectric constant that is above 20, and a bottom surface of the dielectric material 110 is a ground surface that contacts the object. According to the exemplary embodiment of the present invention, the RFID tag antenna 100 can be realized by a small antenna by using the ceramic dielectric material 110.

The feed loop 130 is formed in a part of an upper surface of the dielectric material 110 and has a vertical length L1 and a horizontal length L2. The feed loop 130 is electrically connected to the RFID tag chip 10 and supplies power thereto through a current. The feed loop 130 controls the reactance component $X_a$ of the impedance of the RFID tag antenna 100 by changing the vertical length L1 and the horizontal length L2. In addition, the feed loop 130 is a concave hexahedral shape with 'L'-shaped inside in FIG. 3, and the concave hexahedral shape of the RFID tag antenna 100 can be variously designed by controlling the vertical length L1 and the horizontal length L2.

The radiating patch 150 is formed in a part of an upper surface of the dielectric material 110, together with the feed loop 130, and is designed to have a concave polygon shape for convenience in magnetic coupling with the feed loop 130. The radiating patch 150 radiates an electromagnetic wave that is modulated by the RFID tag chip 10. In design of the RFID tag antenna 100, a resonance frequency of the RFID tag antenna 100 can be controlled by changing a resonance length of the radiating patch 150. In addition, the radiating patch 150 has an octagon shape in FIG. 3, and the octagon-shaped radiating patch 150 can be designed to have various concave polygon shapes according to a structure of the feed loop 130.

The shorting plate 170a is partially formed inside the dielectric material 110, and the shorting plate 170b is partially formed in a side surface that is close to the horizontal length L2 of the feed loop 130 among four side surfaces of the dielectric material 110. The shorting plates 170a and 170b connect the radiating patch 150 and the ground surface to disconnect the radiating patch 150 and the ground surface. Unlike the structure of the shorting plates 170a and 170b in FIG. 1, the shorting plates 170a and 170b in FIG. 3 are formed in a surface that is close to the feed loop 130 according to the exemplary embodiment of the present invention, and therefore the resistance component $R_a$ of the impedance of the RFID tag antenna 100 can be controlled by changing each length S1 and S2 of the shorting plate 170a and 170b, that is, each area of the shorting plate 170a and 170b.

Herein, the radiating patch 150 and the feed loop 130 are magnetically coupled, and the magnetic coupling can serve as an impedance transformer in the RFID tag antenna 100.

FIG. 4 is a configuration of an RFID tag according to another exemplary embodiment of the present invention.

As shown in FIG. 4, the RFID tag according to the present exemplary embodiment of the present invention includes an RFID tag chip 10 and an RFID tag antenna 200.

The RFID tag chip 10 includes information on an object to which an RFID tag is attached, and modulates the amplitude and/or the phase of electromagnetic waves transmitted from an RFID reader so as to transmit the object information. The RFID tag chip 10 controls the amount of power by using input impedance so as to modulate the amplitude and/or the phase of the wave, and includes an RF front-end having the input impedance.

The RFID tag antenna 200 includes a ceramic dielectric material 210, a feed loop 230, a radiating patch 250, and shorting plates 270a and 270b.

The hexahedral ceramic dielectric material 210 has a relative dielectric constant that is above 20, and a bottom surface of the dielectric material 210 is a ground that contacts the object. According to the present exemplary embodiment of the present invention, the RFID tag antenna 200 can be realized by a small antenna by using the ceramic dielectric material 210.

The feed loop 230 is formed in a part of an upper surface of the dielectric material 210, and has a vertical length L3 and a horizontal length L4. The feed loop 230 is electrically connected to the RFID tag chip 10 and supplies power thereto through a current. The feed loop 230 controls a reactance component $X_a$ of impedance of the RFID tag antenna 200 by adjusting the vertical length L3 and horizontal length L4 of the feed loop 230. In addition, the vertical length L1 of the feed loop 130 in FIG. 3 is changed to the vertical length L3 of the feed loop 230 and the horizontal length L2 of the feed loop 130 in FIG. 3 is changed to the horizontal length L4 such that the feed loop 230 has a rectangular-shaped interior.

The radiating patch 250 is formed in a part of an upper surface of the dielectric material 210, together with the feed loop 230, and is designed to have a concave polygon shape for convenience in magnetic coupling with the feed loop 230. The radiating patch 250 radiates the wave that is modulated by the RFID tag chip 10. In design of the RFID tag antenna 200, a resonance length of the radiating patch 250 can be changed in order to control a resonance frequency.

Each of the shorting plates 270a and 270b is placed in a side surface that is close to the horizontal length L2 of the feed loop 230 among four side surfaces of the dielectric material 210, and connects the radiating patch 250 and a ground surface to disconnect the radiating patch 250 and a ground surface. According to the exemplary embodiment of the present invention, unlike the structure of the shorting plates in FIG. 1, the shorting plates 270a and 270b are formed in a surface that is close to the feed loop 230, and therefore a resistance component $R_a$ of an impedance of the RFID tag antenna 200 can be controlled by changing each length S3 and S4 of the shorting plates 270a and 270b. That is, the resistance component $R_a$ of the impedance of the RFID tag antenna can be controlled by changing the size of each area of the shorting plates 270a and 270b.

In this instance, the radiating patch 250 and the feed loop 230 are magnetically coupled, and the magnetic coupling can serve as an impedance transformer in the RFID tag antenna 200.

Figure 5:
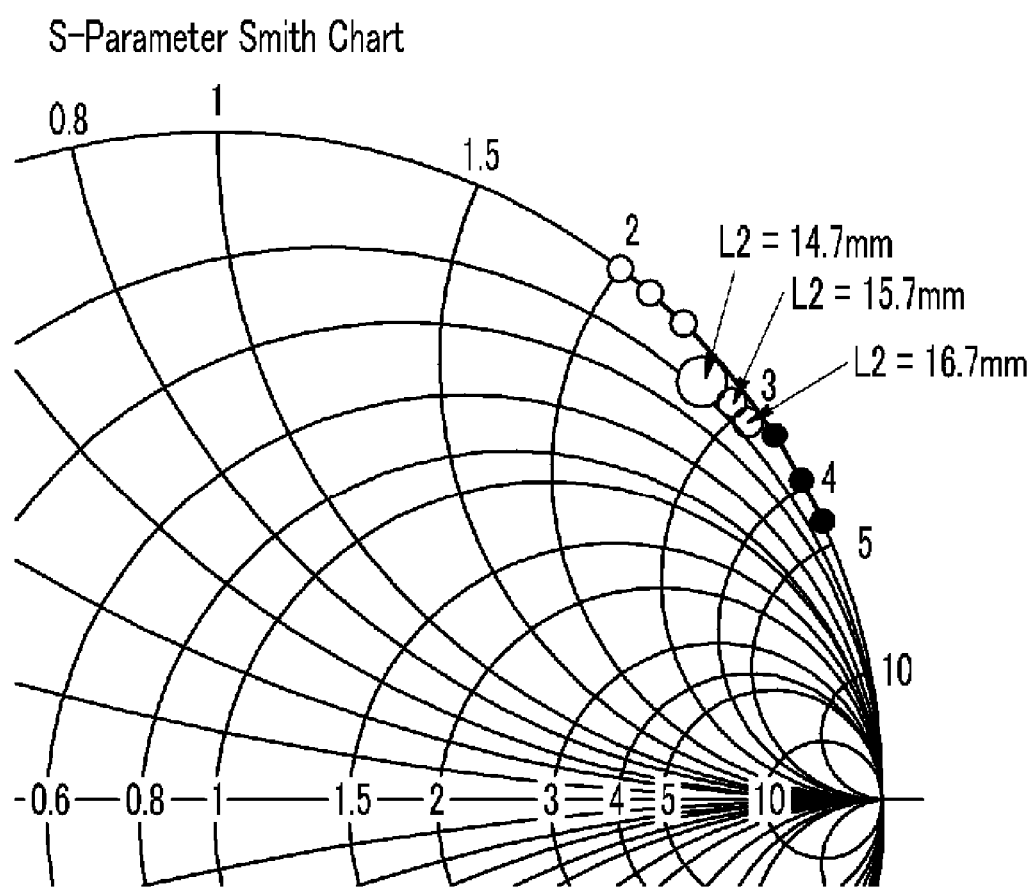
FIG. 5 shows impedance variation of the RFID tag antenna with change of length of a feed loop according to the exemplary embodiment of the present invention.
Figure 6:
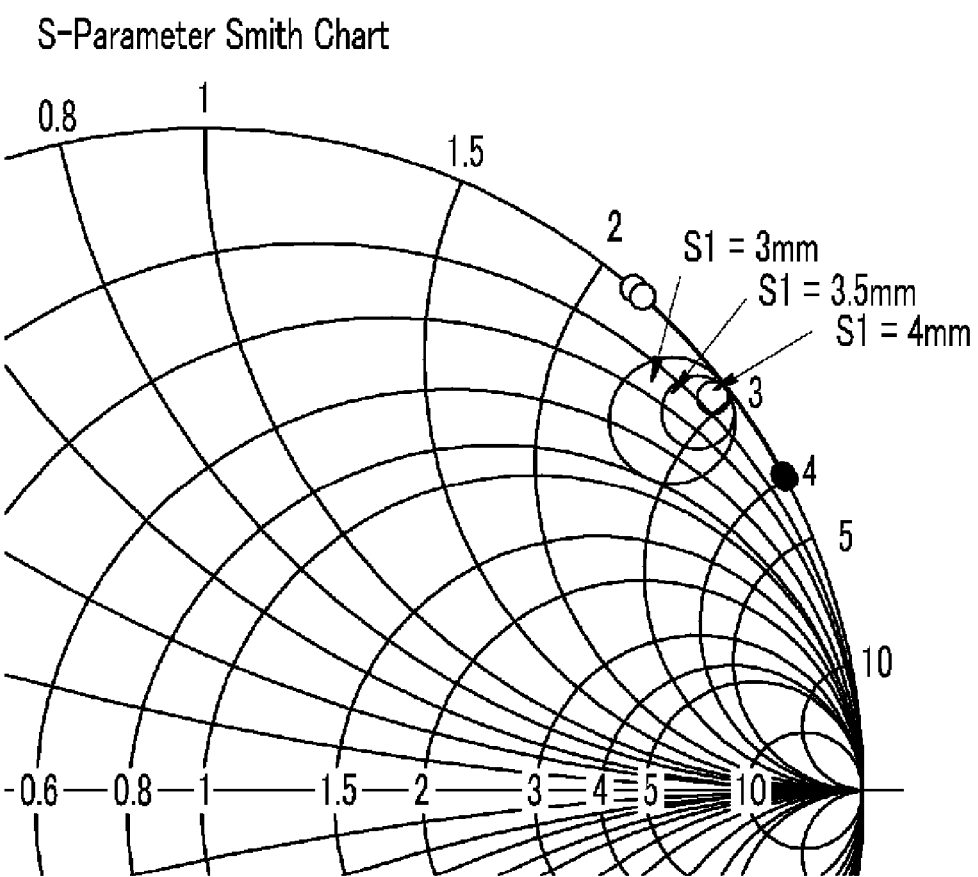
FIG. 6 shows impedance variation of the RFID tag antenna with change of length of a shorting plate according to the exemplary embodiment of the present invention.

With reference to FIG. 5 to FIG. 6, variations of the impedance of the RFID tag antenna according to the exemplary embodiment of the present invention will be described in detail.

FIG. 5 shows an impedance variation of the RFID tag antenna accordance with a change of a length variation of the feeding loop according to the exemplary embodiment of the present invention.

The smith chart of FIG. 5 shows an impedance variation of the RFID tag antenna according to a change of the horizontal length L2 of the feed loop 130 in the RFID tag antenna 100 in FIG. 3.

As shown in FIG. 5, the resistance component $R_a$ of the impedance of the RFID tag antenna 100 is constantly sustained and the inductive reactance component $X_a$ of the impedance of the RFID tag antenna 100 is increased when the horizontal length L2 of the feed loop 130 is changed from 14.7 mm to 16.7 mm.

FIG. 6 shows an impedance variation of the RFID tag antenna in accordance with a change of a length of the shorting plate according to the exemplary embodiment of the present invention.

The Smith chart of FIG. 6 shows the impedance variation of the RFID tag antenna in accordance with a change of the length of the shorting plate 170a of the RFID tag antenna 100 in FIG. 3.

As shown in FIG. 6, the inductive reactance component $X_a$ of the impedance of the RFID tag antenna 100 is constantly maintained and the resistance component $R_a$ of the impedance of the RFID tag antenna 100 is increased when the length S1 of the shorting plate 170a is changed from 3 mm to 4 mm.

As shown in FIG. 5 and FIG. 6, the RFID tag antenna can be efficiently matched to impedance of an RFID tag chip that has a comparatively large capacitive reactance component $X_c$ to a resistance component $R_c$ according to the exemplary embodiment of the present invention.

Figure 7:
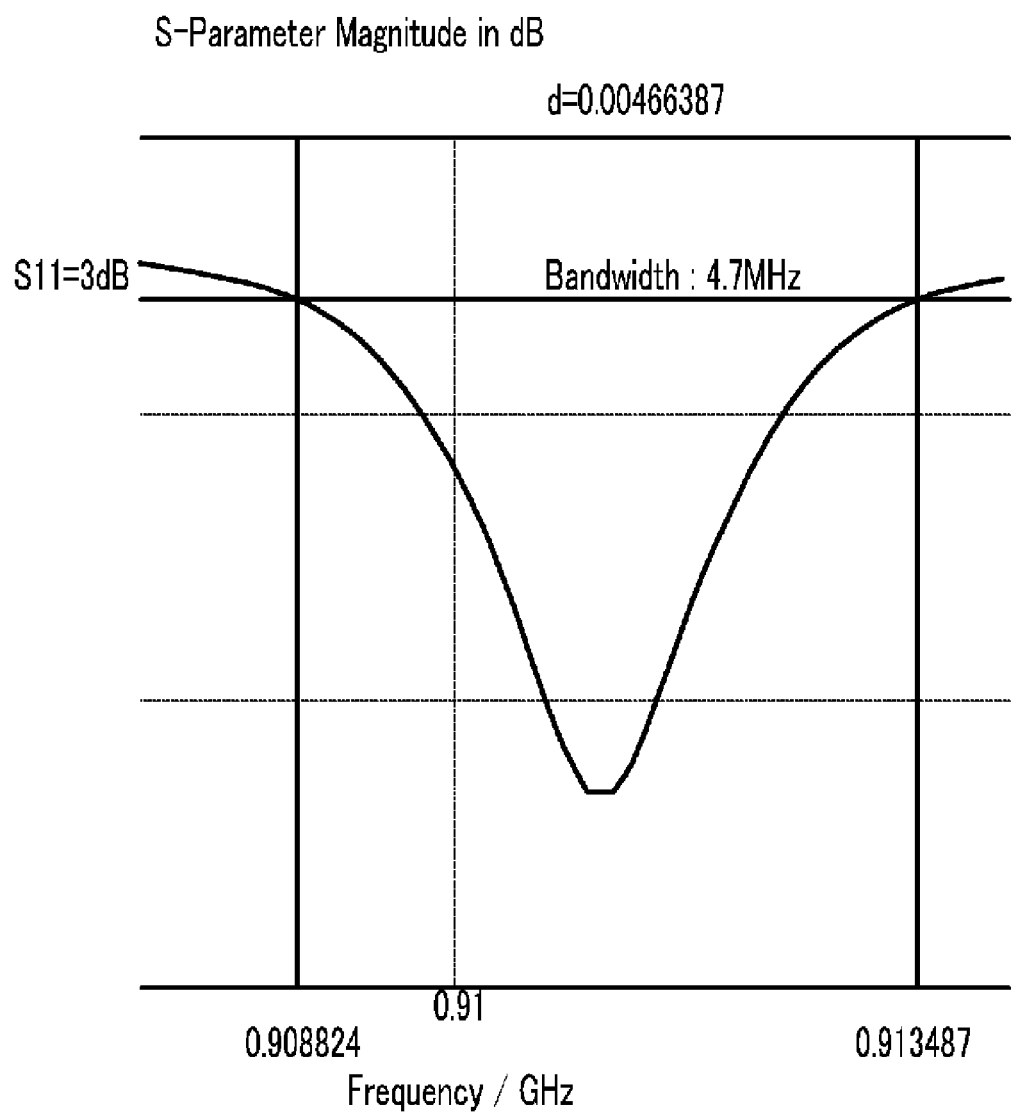
FIG. 7 shows a return loss of the RFID tag antenna according to the exemplary embodiment of the present invention.

With reference to FIG. 7, a return loss between the RFID tag antenna and the RFID tag chip according to the exemplary embodiment of the present invention will be described.

FIG. 7 shows a return loss of the RFID tag antenna according to the exemplary embodiment of the present invention.

As shown in FIG. 7, an operation bandwidth of the RFID tag antenna is 7 MHz with reference to return loss of 3 dB when a volume of the RFID tag antenna according to the exemplary embodiment of the present invention is 20 mm×24 mm×3 mm and a relative dielectric constant of the ceramic dielectric material is 22.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An antenna attached to an object and transmitting electromagnetic waves modulated by a radio frequency identification (RFID) tag chip, the antenna comprising:
    a polyhedral dielectric material comprising a first side that is adjacent to the object, a second side that is parallel with the first side, and a third side that connects the first side and the second side;
    a feel loop having a vertical length and a horizontal length, formed in a part of the second side, and electrically connected with the RFID tag chip for supplying power to the RFID tag chip, the area being adjacent to the third side;
    a polygonal radiating patch formed in a part of the second side and magnetically coupled with the feed loop for radiating the electromagnetic waves; and
    a shorting plate formed in a part of the third side, disconnecting the radiating patch and the first side, and controlling the magnetic coupling of the radiating patch and the feed loop.

2. The antenna of claim 1, wherein impedance of the antenna is conjugate-matched with impedance of the RFID tag chip.

3. The antenna of claim 2, wherein a relative dielectric constant of the dielectric material is greater than 20.

4. The antenna of claim 3, wherein the dielectric material is made of a ceramic material and has a hexahedral shape.

5. The antenna of claim 2, wherein the feed loop has a concave polygon shape including two sides that are parallel with the third side, and the radiating patch is a concave polygon having more sides than the feed loop.

6. The antenna of claim 2, wherein a reactance component of the impedance of the antenna corresponds to the horizontal length of the feed loop.

7. The antenna of claim 2, wherein a resistance component of the impedance of the antenna corresponds to an area of the shorting plate.

8. An antenna attached to an object and transmitting electromagnetic waves modulated by a radio frequency identification (RFID) tag chip, the antenna comprising:
    a hexahedral dielectric material having a bottom surface attached to the object;
    a feed loop formed in a part of an upper surface of the dielectric material, being adjacent to a first side among a plurality of sides of the dielectric material, and electrically coupled with the RFID tag chip for supplying power to the RFID tag chip;
    a polygonal radiating patch formed in a part of the upper surface of the dielectric material and magnetically coupled with the feed loop for radiating the electromagnetic waves; and
    a plurality of shorting plates respectively formed in a part of the first side and disconnecting the radiating patch and the bottom surface of the dielectric material.

9. The antenna of claim 8, wherein a relative dielectric constant of the dielectric material is greater than 20.

10. The antenna of claim 9, wherein a sign of a reactance component of impedance of the antenna and a sign of a reaction component of impedance of the RFID tag chip are opposite to each other.

* * * * *